US008506361B2

(12) United States Patent
Deak

(10) Patent No.: US 8,506,361 B2
(45) Date of Patent: Aug. 13, 2013

(54) FIXTURE TO FACILITATE SANDBLASTING OF A CYLINDRICAL OBJECT

(75) Inventor: Stephen Michael Deak, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/218,040

(22) Filed: Aug. 25, 2011

(65) Prior Publication Data

US 2013/0052920 A1    Feb. 28, 2013

(51) Int. Cl.
*B24B 1/00*     (2006.01)
(52) U.S. Cl.
USPC .............. 451/102; 451/2; 451/38; 451/76; 451/82; 451/84
(58) Field of Classification Search
USPC ............. 451/2, 38, 76, 80, 82, 84, 91, 102, 451/381, 385; 269/44, 37, 42
See application file for complete search history.

(56) References Cited

U.S. PATENT DOCUMENTS

| 2,394,376 | A | * | 2/1946 | Grylewicz et al. | 451/385 |
| 3,041,787 | A | * | 7/1962 | Schnetzer | 451/82 |
| 3,604,157 | A | * | 9/1971 | Fogle | 451/2 |
| 3,672,292 | A | | 6/1972 | Arnold | |
| 5,209,028 | A | * | 5/1993 | McDermott et al. | 451/89 |
| 5,411,244 | A | * | 5/1995 | Turner | 269/42 |
| 5,605,492 | A | * | 2/1997 | Klingel | 451/40 |
| 5,704,824 | A | | 1/1998 | Hashish et al. | |
| 5,709,587 | A | * | 1/1998 | Shaffer | 451/38 |
| 6,244,927 | B1 | * | 6/2001 | Zeng | 451/2 |
| 6,244,934 | B1 | * | 6/2001 | Miyai et al. | 451/38 |
| 6,520,838 | B1 | * | 2/2003 | Shaw | 451/38 |
| 6,568,994 | B1 | * | 5/2003 | Shaw | 451/36 |
| 6,932,681 | B2 | * | 8/2005 | Suzuki et al. | 451/76 |
| 7,008,293 | B2 | * | 3/2006 | Kurogouchi | 451/2 |
| 8,187,056 | B2 | * | 5/2012 | Hashish et al. | 451/38 |
| 2008/0142050 | A1 | * | 6/2008 | Hashish et al. | 134/22.12 |

FOREIGN PATENT DOCUMENTS

| EP | 0960950 | 12/1999 |
| EP | 0960950 A1 | 12/1999 |
| EP | 2082703 | 7/2009 |
| EP | 2082703 A2 | 7/2009 |

(Continued)

OTHER PUBLICATIONS

Search Report and Written Opinion from EP Application No. 12181230.9 dated Dec. 7, 2012.

(Continued)

*Primary Examiner* — George Nguyen
(74) *Attorney, Agent, or Firm* — Nixon & Vanderhye P.C.

(57) ABSTRACT

A fixture for facilitating sandblasting of a generally cylindrical object includes a frame, a rotary table mounted on the frame, and a moveable blast head which can direct a flow of grit onto a cylindrical object mounted on the rotary table. The blast head may be movable vertically so that it can be extended down into the interior of a cylindrical object. The blast head may also be movable in a rotational fashion. Further the blast head may be movable in horizontal directions so that the blast head can be moved relative to a vertically extending cylindrical surface of a cylindrical object mounted on the rotary table. Controlled movements of the rotary table and the blast head allow uniform sandblasting of the cylindrical object.

20 Claims, 6 Drawing Sheets

(56) References Cited

FOREIGN PATENT DOCUMENTS

| | | |
|---|---|---|
| JP | 2010-274354 | 12/2010 |
| JP | 2010274354 A | 12/2010 |
| WO | 98/07548 | 2/1998 |
| WO | 9807548 A1 | 2/1998 |
| WO | 01/15866 | 3/2001 |
| WO | 0115866 A1 | 3/2001 |

OTHER PUBLICATIONS

Extended Search Report issued in EP Application No. 12181230.9 on Dec. 7, 2012.

* cited by examiner

FIXTURE TO FACILITATE SANDBLASTING OF A CYLINDRICAL OBJECT

BACKGROUND OF THE INVENTION

Gas turbines used in the electrical power generation industry include combustors which burn an air-fuel mixture. The expanding gases are then routed into the turbine section to generative motive force. The combustors typically include a cylindrical combustion liner 100, as shown in FIG. 1. The combustion of the air-fuel mixture occurs inside the cylindrical combustion liner.

After a combustion liner 100 has been used in a gas turbine for an extended period of time, it is necessary to repair and recondition the combustion liner 100. Part of the repair and reconditioning process involves sandblasting the interior cylindrical surface of the combustion liner to remove any buildup of combustion byproducts.

One way to accomplish sandblasting of the interior cylindrical surface is to place the combustion liner in a blast room, and then manually direct a flow of grit along the interior cylindrical surface of the combustion liner to remove contaminants. An operator typically holds a hose that supplies a flow of grit delivered under pressure, and the operator directs the flow of grit onto the interior cylindrical surface of the combustion liner 100. Unfortunately, it is very difficult for an operator to evenly or uniformly sandblast the entire interior cylindrical surface.

Another option is to purchase a self-contained sandblasting unit which is designed to automatically sandblast such objects. A self-contained sandblasting unit typically includes an enclosure, a mounting system for mounting a cylindrical object inside the enclosure, a grit supply and recovery system, and a movable blast head which can be programmed to move in an automated fashion. The blast head moves automatically under the direction of a processor to direct a flow of grit along the interior cylindrical surface of a combustion liner to remove any contaminants.

Although a self-contained sandblasting unit can conduct a more uniform sandblasting operation on the interior of a cylindrical combustion liner than a manual sandblasting operation, these self-contained sandblasting units are relatively expensive. For this reason, many in the industry prefer to manually sandblast combustion liners, even though it will result in less uniform results.

BRIEF DESCRIPTION OF THE INVENTION

In a first aspect, the invention may be embodied in a fixture that facilitates sandblasting of a generally cylindrical object. The fixture includes a frame, a rotary table mounted on the frame, the rotary table being configured to hold a generally cylindrical object and being configured to selectively rotate the cylindrical object, and a blast head movement unit mounted on the frame. The fixture further includes a blast head mounted on the blast head movement unit, wherein the blast head movement unit is configured to selectively move the blast head in at least one direction, and wherein the blast head is configured to be attached to a grit supply system.

In another aspect, the invention may be embodied in a fixture that facilitates sandblasting a generally cylindrical object. The fixture includes a generally rectangular frame with a rotary table mounted on a lower portion of the frame, the rotary table including a motor configured to cause the rotary table to selectively rotate on the frame and a mounting system that operates to clamp a generally cylindrical object on a top surface of the rotary table. The frame also includes a blast head controller mounted on an upper portion of the frame, and a blast head mounted on the blast head controller, wherein the blast head controller causes the blast head to selectively move in the vertical direction, and wherein the blast head is configured to be attached to an external grit supply system.

DETAILED DESCRIPTION OF THE INVENTION

In the following description, references are made to "sandblasting." This term is intended to encompass any procedures where a flow of abrasive particles are used to remove contaminants or surface coatings. While sand was traditionally used for this purpose, other abrasive materials can also be used. For example, the blast media could also be aluminum oxide, silicon carbide, garnet, fruit stones, walnut shells, rice hulls, dry ice pellets, or a variety of other media, as is well known to those of ordinary skill in the art.

Figure 2:
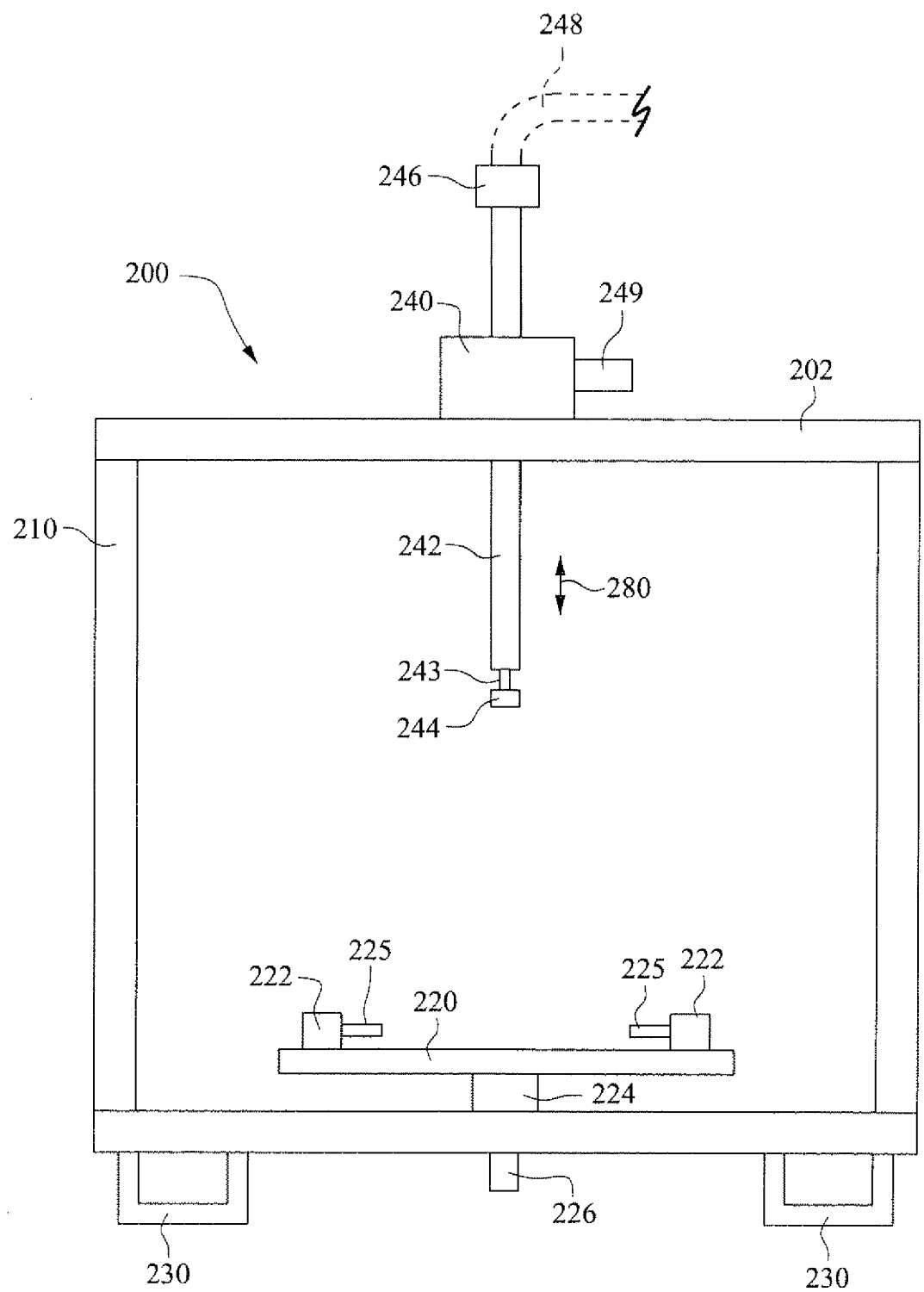
FIG. 2 is a diagram of a fixture which facilitates sandblasting of a generally cylindrical object.

FIG. 2 illustrates a first embodiment of a fixture which facilitates sandblasting of an internal wall of a generally cylindrical object. The fixture 200 includes a frame 210. A rotary table 220 is rotationally mounted on the frame 210 by a rotational mount 224. A mounting system on the top surface of the rotary table 220 is used to mount a generally cylindrical object onto the top surface of the rotary table 220. A motor 226 can cause the rotary table 220 to selectively rotate.

Figure 3:
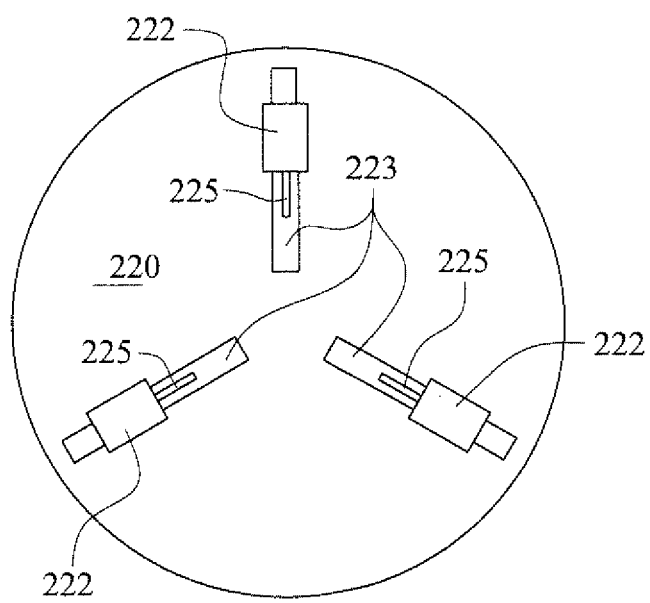
FIG. 3 is a top view of a rotary table which can be used in a fixture as illustrated in FIG. 2.

A top view of the rotary table 220 is illustrated in FIG. 3. As shown in FIGS. 2 and 3, the mounting system includes a plurality of mounting units 222 which are positioned symmetrically around the center of the rotary table 220. The rotary table 220 includes a plurality of radially extending slots 223 which allow the mounting units 222 to be fixed at different distances from the center of the rotary table 220. Once the mounting units 222 are fixed in place, the mounting units 222 can be operated to cause fingers 225 to selectively extend from the mounting units 222 to engage and hold a cylindrical object placed on the top surface of the rotary table 220. The mounting units 222 can also retract the movable fingers 225 to release the cylindrical object.

In the embodiment illustrated in FIG. 3, three mounting units 222 are provided on the rotary table 220. In alternate embodiments, fewer or greater numbers of the mounting units 222 could be provided.

In some embodiments, the mounting units 222 could be quick release mounts which include a hand operable lever that causes the finger 225 to extend or retract from the mounting units 222. In other embodiments, the mounting units could be electrically, hydraulically or pneumatically operated to cause the fingers 225 to extend and retract. In still other embodiments, the fingers could have external screw threads that screw into threads on the body of the mounting units so that the fingers 225 can be extended and retracted. Virtually any type of manual or power operated mounting units 222 that will securely hold a cylindrical object on the top surface of the rotary table 220 could be used.

The fixture illustrated in FIG. 2 also includes a blast head movement unit 240 which is mounted at the top of the frame 210. The blast head movement unit 240 controls movements of a blast head 244 which sprays grit supplied from a grit supply system. In this embodiment, an extension arm 242 is moveably mounted in the blast head movement unit 240. A grit supply pipe 243 extends down the length of the extension arm 242 to supply grit to the blast head 244.

At the upper end of the extension arm 242 a coupling unit 246 is used to couple the grit supply pipe 243 to an external grit supply system hose 248. The supply hose 248 supplies grit from an external grit supply system.

The extension arm 242 can be moved upward and downward in a vertical direction, as indicated by the arrows 280, by the blast head movement unit 240. A drive motor 249 could be used to cause selective vertical movement of the extension arm 242.

Figure 1:
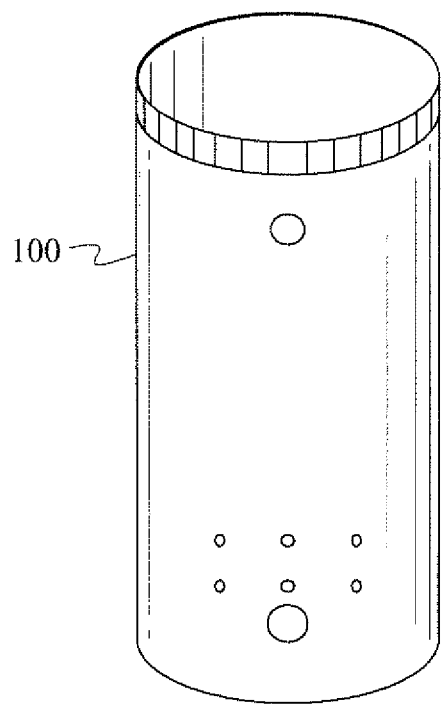
FIG. 1 is a perspective view of a cylindrical combustion liner of a gas turbine.

Once a cylindrical object such as the combustor liner 100 illustrated in FIG. 1 has been clamped onto the rotary table 220, the blast head 244 can be moved downward inside a cylindrical object so that grit sprayed from the blast head 244 will impinge upon the interior cylindrical surface of the cylindrical object. By selectively rotating the rotary table 220 using the motor 226, and by selectively moving the blast head 244 upward and downward within the cylindrical object using the blast head movement unit 240, one can direct a stream of grit onto the entire interior cylindrical surface of the cylindrical object. Provided the movements are coordinated, it is possible to accomplish uniform sandblasting of the interior cylindrical surface.

In preferred embodiments, a controller is coupled to the blast head movement unit 240 and to the motor 226 that controls movement of the rotary table 220. The controller causes selective movement of the rotary table 220 and the blast head 244 to accomplish uniform sandblasting of the interior surface of the cylindrical object.

In some embodiments, the blast head 244 may also be rotatable. This could mean rotating the blast head 244 on the extension arm 242, or rotating the extension arm 242. An additional rotational control unit located within the blast head movement unit 240 could be used to cause rotational movements of the blast head 244. The rotational control unit could be used to cause oscillating movements of the blast head 244 to effect uniform sandblasting of the interior cylindrical surface of a cylindrical object.

In the embodiment illustrated in FIG. 2, forklift receivers 230 are mounted on the bottom of the frame 210. The forklift receivers 230 are designed to receive the forks of a standard forklift so that a forklift can be used to move the fixture 200 into and out of a sandblasting facility.

A fixture 200 as illustrated in FIG. 2 can be moved into the interior of a typical blast room that includes an enclosure for performing sandblasting operations, a grit supply system capable of generating a flow of grit used for sandblasting, and a grit recovery system for recycling the grit used in sandblasting operations. Once the fixture 200 is carried into the blast room, and a cylindrical object is mounted on the rotary table 220, the fixture 200 would be coupled to a grit supply line 248 of an external grit supply system of the blast room. A controller would be used to cause selective movements of the blast head 244 and the rotary table 220 to accomplish uniform sandblasting of the interior of the cylindrical object.

The fixture 200 illustrated in FIG. 2 is designed to be used in a pre-existing blast room, and it is designed to be coupled to an external grit supply unit. Thus, the fixture does not itself include a separate enclosure, a grit supply system or a grit recovery system. This means that the fixture illustrated in FIG. 2 can be manufactured for far less than the cost of a self-contained sandblasting unit. However, the fixture still allows one to accomplish uniform sandblasting of the interior surface of a cylindrical object, just like one can accomplish with a more expensive self-contained sandblasting unit.

A fixture 200 as illustrated in FIG. 2 makes it possible to accomplish high quality sandblasting operations on the interior surface of a combustion liner during a repair and reconditioning process for less than it would cost to accomplish the same sandblasting operation with a traditional self-contained sandblasting unit. Thus, the fixture 200 illustrated in FIG. 2 can lower the cost of performing the overall repair and reconditioning process.

Figure 4:
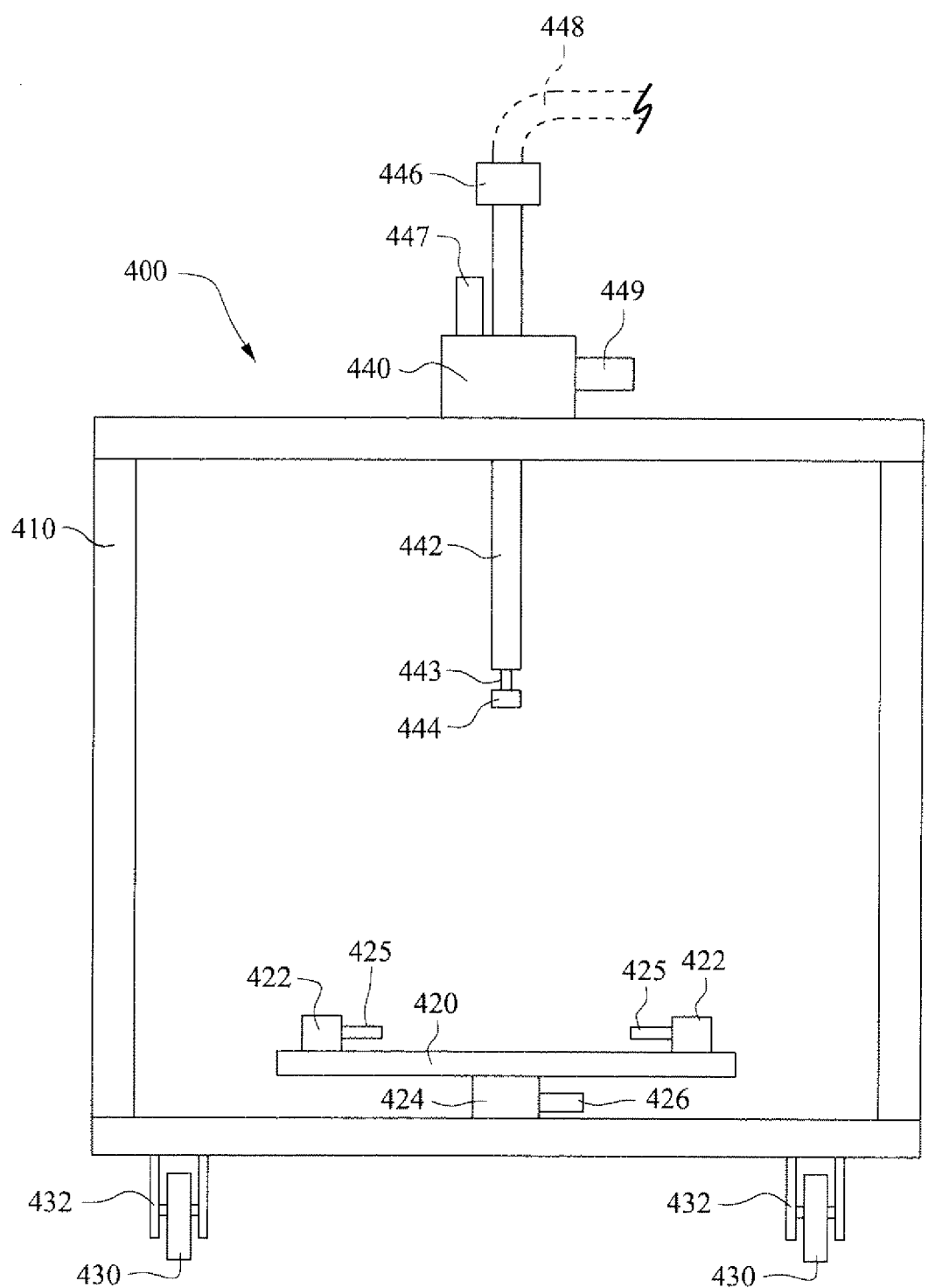
FIG. 4 is a diagram of a second embodiment of a fixture that facilitates sandblasting of a generally cylindrical object.

FIG. 4 illustrates a second embodiment of a fixture 400 that can be used to conduct sandblasting operations on a cylindrical object. In this embodiment, a rotary table 420 is mounted on a frame 410 by a rotary mount 424. However, in this embodiment, a motor 426 for causing selective rotational movement of the rotary table 420 is mounted inside the frame. Mounting units 422 with extendable fingers 425 are provided on the top surface of the rotary table 420 to hold a cylindrical object.

An extension arm 442 is mounted on a movement unit 440. A blast head 444 coupled to a grit supply pipe 443 is mounted on the extension arm 442. A first motor 449 is used to cause selective vertical movement of the extension arm 442 and blast head 444. A second motor 447 is used to cause selective rotational movement of the blast head 444. A coupling unit 446 is used to couple the blast head 444 to a flow of grit supplied through a grit supply line 448 of an external grit supply unit.

In this embodiment a plurality of wheels 430 are mounted to the bottom surface of the frame 410 by axle units 432. This allows the fixture 400 to be easily moved into and out of an existing blast room.

Figure 5:
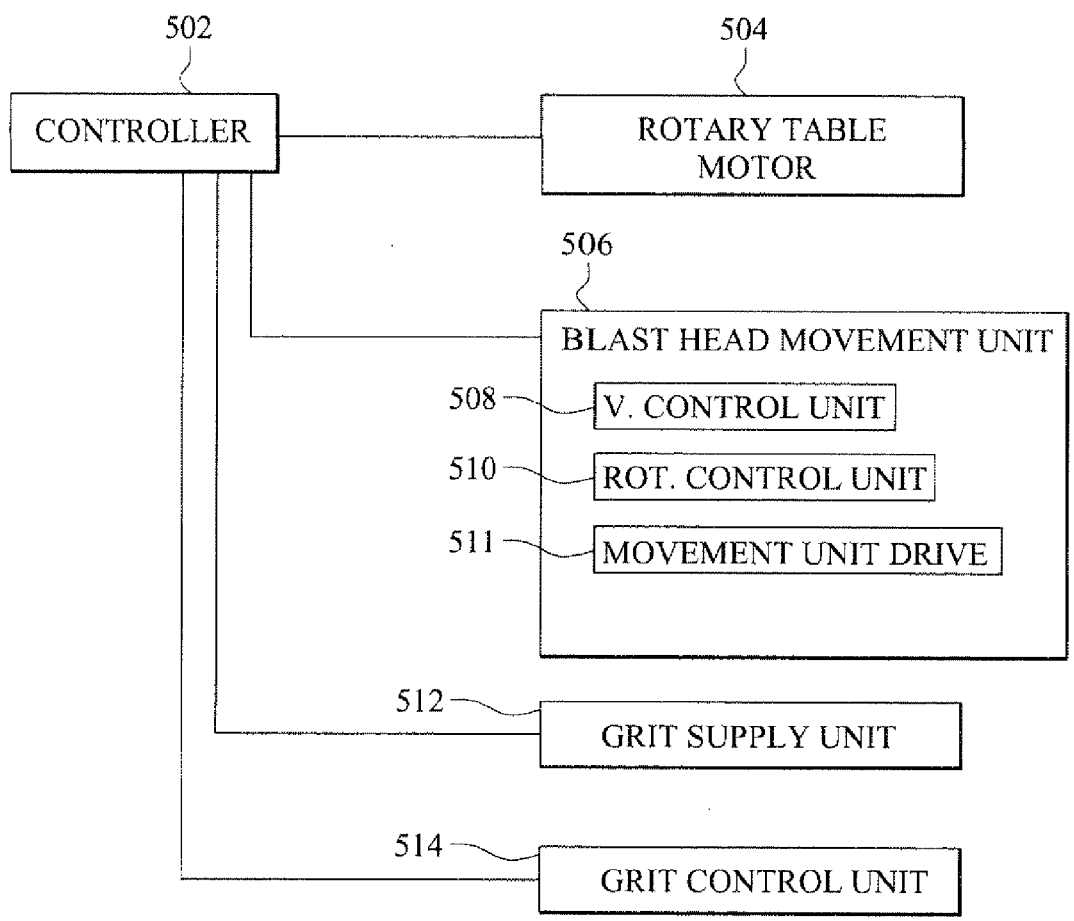
FIG. 5 is a diagram illustrating the major elements of a control system for a fixture as illustrated in FIGS. 2 and 4.

FIG. 5 illustrates a control system that could be used to accomplish automated sandblasting operations with the fixtures illustrated in FIGS. 2 and 4. The control system includes a controller 502 which is operatively coupled to a rotary table motor 504 that causes rotational movement of a rotary table of a fixture. The controller 502 is also operatively coupled to a blast head movement unit 506. In some embodiments, the blast head movement unit 506 would only include a vertical control unit 508. In other embodiments, the blast head movement 506 would also include a rotational control unit 510 that causes rotational or oscillatory movement of the blast head.

In some embodiments, the controller 502 is coupled to an external grit supply unit 512. The external grit supply unit 512 would not be a part of the fixture, but rather would supply a flow of grit to the fixture. When connected in this fashion, the controller 502 would be able to control the flow rate and/or pressure at which grit is being supplied to the fixture by the external grit supply unit 512.

In other embodiments, an external grit supply unit would still be coupled to the fixture to supply a flow of grit to the fixture. However, a grit control unit 514 could be a part of the fixture itself. The grit control unit 514 would be capable of controlling the flow rate and/or pressure of the grit being supplied to the blast head of the fixture. The grit control unit 514 would also be coupled to the controller 502 so that the controller 502 can selectively vary the flow rate and/or pressure of the grit being supplied to the blast head.

Some embodiments might have a controller coupled to both an external grit supply unit 512 and a grit control unit 514 that is part of the fixture itself.

A fixture embodying the invention could be designed only to conduct sandblasting operations on the interior surfaces of cylindrical object. However, in alternate embodiments, the fixture may be designed to conduct sandblasting operations on both the interior and exterior surfaces of a cylindrical object. Further, a fixture embodying the invention may be designed so that the blast head can be manually or automatically moved closer to or farther away from the surfaces being sandblasted.

Figure 6:
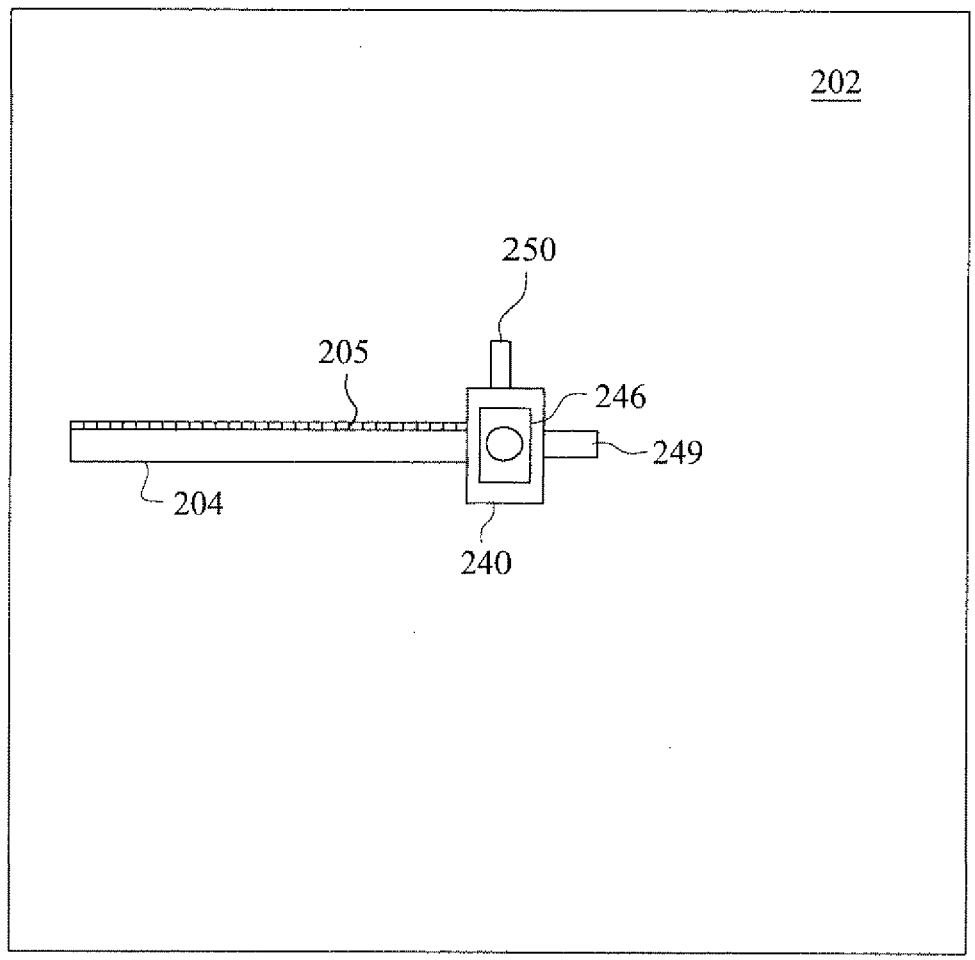
FIG. 6 is a top view of a fixture that facilitates sandblasting of a cylindrical object.

FIG. 6 presents a top view of the fixture illustrated in FIG. 2. The top wall 202 of the fixture includes a slot 204 that extends from a center of the top wall 202 towards one side edge. In this embodiment, a rack gear 205 is provided along one edge of the slot 204.

The movement unit 240, as well as the attached extension arm 242, are mounted in the slot 204. This allows the movement unit 240 and the extension arm 242 to be selectively re-positioned at different locations relative to the center of the top wall 202 of the fixture. In some embodiments, it may only be possible to manually move the movement unit 240 along the slot 204, and to fix the movement unit 240 in a desired position. In other embodiment, a drive unit in the movement unit 240 is used to move the movement unit 240 into a desired position, and to hold the movement unit 240 at that position.

When a fixture is configured as illustrated in FIGS. 2 and 6, the blast head 244 on the extension arm 242 can be positioned at a desired distance from the interior surface of a cylindrical objected that is mounted on the rotary table 220. This makes it easier to control the sandblasting operation.

In addition, the extension arm 242 and blast head 244 could also be positioned outside a cylindrical object that is mounted on the rotary table 220. This would allow the blast head 244 to conduct a sandblasting operation on the exterior surface of the cylindrical object.

The arrangement illustrated in FIG. 6 is only one example. In other embodiments, the movement unit 240 and the extension arm 242 could be mounted on rails that are positioned on the top of the fixture. Also, the movement unit and extension arm could be movable in multiple directions, rather than in the single direction illustrated in FIG. 6. Further, the movement direction could be a diagonal direction, which might allow the movement unit 240 to move farther away from the center of the fixture than the embodiment illustrated in FIG. 6.

If the movement unit 240 includes a drive unit, a controller operatively coupled to the drive unit could selectively activate the drive unit to reposition the blast head before or during sandblasting operations. In the embodiment illustrated in FIG. 6, a rack gear 205 is provided along one side edge of the slot 204. A pinion gear coupled to a drive motor 250 on the movement unit 240 would engage the rack gear 205. Thus, rotation of the pinion gear by the drive motor 250 would move the movement unit 240 along the slot to different positions with respect to the center of the frame. This would allow the blast head 244 to be selectively moved closer to and farther away from a surface of an object as the object is being sandblasted. If a cylindrical object includes contoured surfaces or has a varying diameter, movement of the blast head in this fashion may be desirable to ensure that the blast head maintains a substantially constant distance from the surface, thereby ensuring efficient sandblasting operations.

The control system illustrated in FIG. 5 also shows that the blast head movement unit 506 includes a movement unit drive 511. The movement unit drive 511, which would be under the control of the controller 502, corresponds to the drive motor 250 illustrated in FIG. 6.

The drive mechanism for moving the movement unit 240 on the frame, as illustrated in FIG. 6, includes a drive motor 250, a pinion gear and the rack gear 205. This drive mechanism is but one example of how the movement unit 240 could be selectively moved on the frame. In other embodiments, an alternate drive mechanism could be used. For example, the drive mechanism could be a linear motor, an arrangement of pulleys and drive belts or wires, a hydraulic or pneumatic movement mechanism, or any other sort of drive mechanism, as is well known to those of ordinary skill in the art.

The controller 502 illustrated in FIG. 5 could be provided as part of the fixture. In other instances, the controller could be a separate external controller that is coupled to the various drive mechanisms and control units of the fixture.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fixture that facilitates sandblasting of a generally cylindrical object, comprising:
a frame;
a rotary table mounted on the frame, the rotary table comprising a mounting system that is operable to securely hold a generally cylindrical object and being configured to selectively rotate the cylindrical object, the mounting system comprising a plurality of mounting units that operate to clamp a generally cylindrical object between the plurality of mounting units;
a blast head movement unit mounted on the frame; and
a blast head mounted on the blast head movement unit, wherein the blast head movement unit is configured to selectively move the blast head in at least one direction, and wherein the blast head is configured to be attached to a grit supply system.

2. The fixture of claim 1, wherein the blast head movement unit is configured to selectively move the blast head in the vertical direction.

3. The fixture of claim 2, wherein the blast head movement unit is also configured to selectively move the blast head in a rotational direction.

4. The fixture of claim 1, wherein the blast head movement unit is configured to selectively move the blast head in a rotational direction.

5. The fixture of claim 1, wherein the blast head movement unit is configured to cause the blast head to oscillate.

6. The fixture of claim 1, further comprising a controller that is coupled to the rotary table and the blast head movement unit, the controller sending signals to the rotary table to cause the rotary table to selectively rotate, the controller also sending signals to the blast head movement unit to cause the blast head to selectively move in at least one direction.

7. The fixture of claim 6, wherein the controller is also configured to send signals to an external grit supply system to control a flow of grit supplied by the grit supply system.

8. The fixture of claim 6, further comprising a grit control unit that controls a flow of grit that is sprayed from the blast head, wherein the controller is coupled to the grit control unit, and wherein the controller sends signals to the grit control unit that cause the grit control unit to selectively vary the flow of grit that is sprayed from the blast head.

9. The fixture of claim 1, further comprising a grit control unit that controls a flow of grit that is sprayed from the blast head.

10. The fixture of claim 1, further comprising a coupling unit that couples the blast head to a grit supply line of an external grit supply system.

11. The fixture of claim 1, wherein the mounting units are mounted in slots that extend in a radial direction relative to a center of the rotary table such that the mounting units can be selectively positioned at a plurality of different positions relative to the center of the rotary table.

12. The fixture of claim 1, wherein the rotary table includes a motor that is configured to selectively rotate the rotary table on the fixture.

13. The fixture of claim 1, wherein the blast head movement unit is movably mounted on the frame so that it can be selectively repositioned on the frame.

14. The fixture of claim 13, further comprising a drive unit that is configured to selectively move the blast head relative to the frame.

15. A fixture that facilitates sandblasting a generally cylindrical object, comprising:
    a generally rectangular frame;
    a rotary table mounted on a lower portion of the frame, the rotary table comprising:
        a motor configured to cause the rotary table to selectively rotate on the frame, and
        a mounting system comprising a plurality of mounting units that operate to clamp a generally cylindrical object between the plurality of mounting units on a top surface of the rotary table;
    a blast head controller mounted on an upper portion of the frame; and
    a blast head mounted on the blast head controller, wherein the blast head controller causes the blast head to selectively move in the vertical direction, and wherein the blast head is configured to be attached to an external grit supply system.

16. The fixture of claim 15, wherein the blast head controller is also configured to cause the blast head to move in a rotational direction.

17. The fixture of claim 15, further wherein the blast head controller comprises:
    an extension arm mounted on the blast head controller and movable vertically with respect to the blast head controller, wherein the blast head is mounted on a lower portion of the extension arm; and
    a vertical control unit that causes the extension arm to selectively move vertically with respect to the blast head controller.

18. The fixture of claim 17, wherein the blast head controller further comprises a rotational control unit that causes the blast head to selectively move in a rotational direction around a longitudinal axis of the extension arm.

19. The fixture of claim 1, wherein the fixture is configured to be located inside a separate blasting room, and wherein the blast head is configured to be coupled to an external grit supply system associated with the blasting room.

20. The fixture of claim 15, wherein the fixture is configured to be located inside a separate blasting room.

* * * * *